No. 635,435. Patented Oct. 24, 1899.
E. FOWLER.
BICYCLE SUPPORT.
(Application filed Dec. 9, 1898.)
(No Model.)
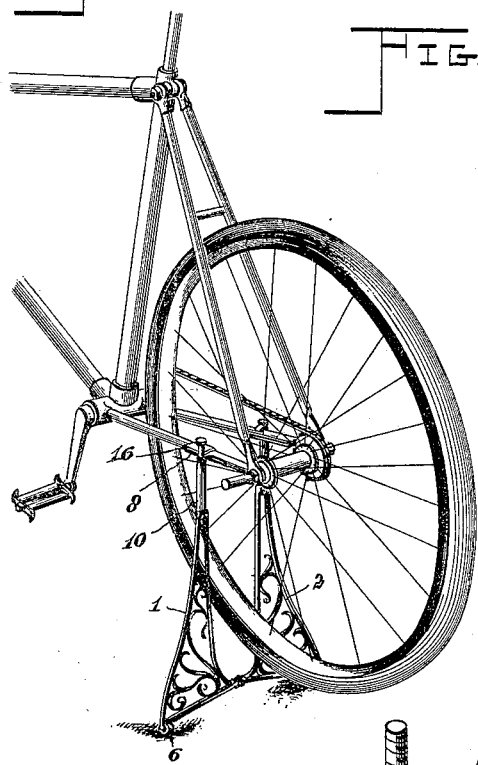
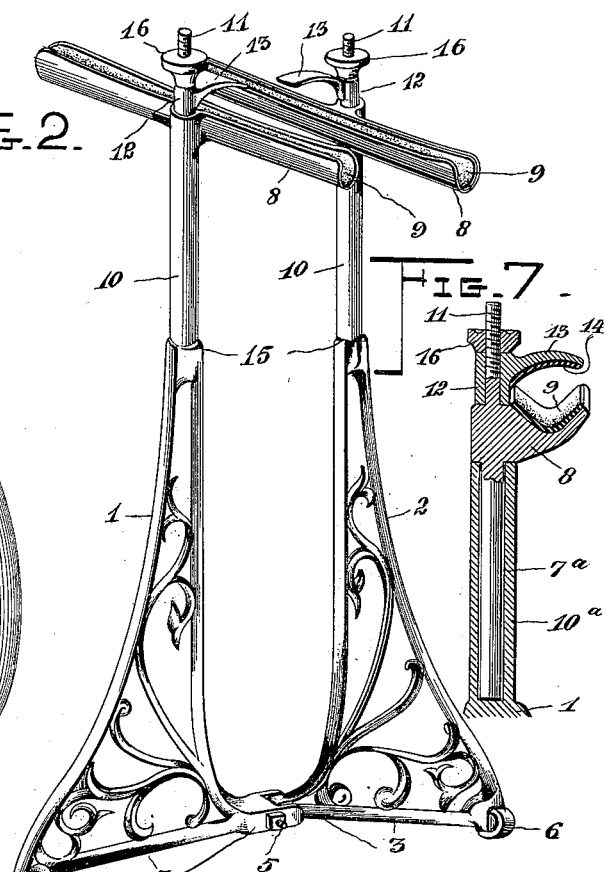
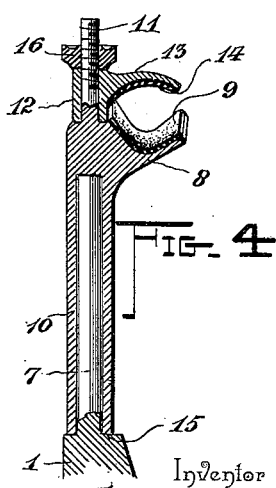
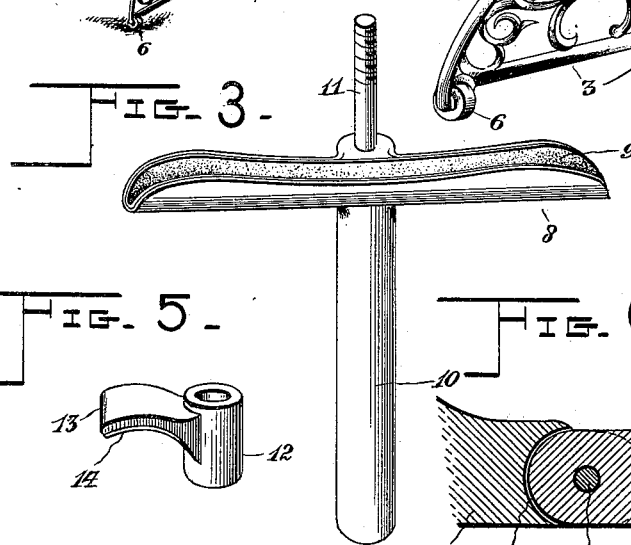
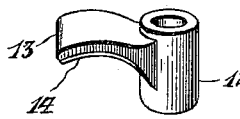
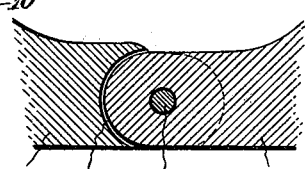
Witnesses
Inventor
Eugene Fowler,
By his Attorneys,

UNITED STATES PATENT OFFICE.

EUGENE FOWLER, OF LAUREL, DELAWARE.

BICYCLE-SUPPORT.

SPECIFICATION forming part of Letters Patent No. 635,435, dated October 24, 1899.

Application filed December 9, 1898. Serial No. 698,773. (No model.)

*To all whom it may concern:*

Be it known that I, EUGENE FOWLER, a citizen of the United States, residing at Laurel, in the county of Sussex and State of Delaware, have invented a new and useful Bicycle-Support, of which the following is a specification.

This invention relates to bicycle-supports; and the object thereof is to provide such a device applicable to the rear forks of a bicycle to hold the machine upright when not in use, supporting the rear wheel up from the floor and permitting of the driving-gear being operated to revolve the wheel for purposes of cleaning and display.

A further object is to permit of the bicycle being moved bodily about on the floor of the show-room or other place.

The present invention is designed to improve the construction shown in my former patent, No. 593,521, dated November 9, 1897.

To this end the invention consists in the combination and arrangement of parts, as will be hereinafter more fully described, and particularly pointed out in the claims.

In the drawings, Figure 1 is a perspective view of the rear portion of a bicycle having the support applied thereto. Fig. 2 is a detail perspective view of the stand. Fig. 3 is a detail perspective view of one of the seats for the rear forks. Fig. 4 is a detail sectional view taken vertically through the connection of the seat with the frame of the support. Fig. 5 is a detail perspective view of one of the clamps or holders for engaging over the top of the rear forks. Fig. 6 is a detail sectional view of the hinge connection for the two sections of the frame of the support. Fig. 7 is a sectional view showing a modified form of connection between the seats and the frame of the support.

Corresponding parts are denoted by like reference characters in all the figures of the drawings.

Referring to the accompanying drawings, particularly to Fig. 2 thereof, the frame of the support is in two duplicate half sections or uprights 1 and 2. Each upright is in the form of an approximately right-angle triangle having a base extension 3 extending from the right-angle side of the base. One of these extensions is provided with a socket 4 (shown in Fig. 6) and the extension of the other section is fitted loosely within the socket, having a pivot-bolt 5 passing through the two extensions and forming a hinge connection for the uprights. This hinge connection permits of the uprights being adjusted toward or away from each other in the same vertical plane. Rollers 6 are provided upon the outer lower corners of each upright to permit of the frame being rolled about upon the floor. The upper end of each upright is continued upward to form an integral shank or spindle 7, which is reduced in thickness to form a circumferential stop-shoulder 15.

In Fig. 3 is illustrated one of the seats 8, which are applied to the spindles of the respective uprights of the frame. This seat is of suitable length and is concaved upon its upper face, which is provided with a lining 9, of leather or other suitable material, to protect the enamel of the frame of the bicycle. A sleeve 10 carries the seat at its upper end and at one side thereof, and a threaded stud 11 extends a suitable distance above the seat and in vertical alinement with the sleeve. It will be noted that the seat is not arranged at right angles to the sleeve 10, but inclined downward across the same. The sleeves 10 are adapted to be loosely mounted upon the spindles 7 of the respective frame-sections, so as to turn axially thereon, with the seats disposed upon the inside thereof and the lower ends of the sleeves resting upon the stop-shoulders 15.

An obvious change in the relation of the parts of the connection between the seats and the frame is shown in Fig. 7, in which the spindle 7ª is formed upon the seat 8 and the sleeve 10ª upon the upper end of the frame section or upright. This change is simply a reversal of the positions of the spindle and the sleeve.

To mount a bicycle upon the frame thus constructed, the rear wheel is run between the uprights of the frame, and the rear forks of the machine are placed in the respective seats 8. By reason of the loose mounting of the sleeves 10 the seats may be adjusted thereon to fit the converging forks, and the inclination of the seats adapts the latter to the drop of the forks, as will be understood. The length of the uprights is such as to hold the rear wheel away from the floor, and the weight of the machine will tend to draw the upper or seat ends of the uprights together upon the hinge connection as a center, which automatically clamps the seats firmly upon the rear forks, and the bicycle is firmly supported in an upright position.

To more positively connect the support upon the frame of the bicycle, clamps or holders are provided to engage over the upper faces of the rear forks and clamp the same in the seats. One of these holders is illustrated in detail in Fig. 5 and consists of a sleeve 12, adapted to turn axially upon the threaded studs 11, having a transversely-arranged lug or finger 13. These parts are formed integral, the finger being concaved upon its under face and provided with a lining 14 in the same manner as the seats. A holder is provided for each seat, being loosely mounted upon the threaded studs 11 by means of the sleeves. After the bicycle has been fitted to the frame of the support the clamps or holders are swung around upon the studs 11, the fingers 13 engaged over the upper faces of the rear forks and clamped thereon by means of suitable thumb-nuts 16. In this manner the support is firmly connected to the frame of the bicycle, and by means of the rollers 6 the bicycle may be moved about from place to place without removing the support therefrom.

The bases of the uprights of the frame extend at opposite sides of the frame only far enough to substantially support the bicycle, and the sections may be taken apart by removing the pivot-bolt 5 for convenience in shipping.

All of the several parts are substantially connected to the frame in convenient arrangement for use and the number of parts are reduced to a minimum, thus providing an exceedingly simple and effective device.

Changes in the form, proportion, and minor details of construction and arrangement may be made without departing from the spirit and scope or sacrificing any of the advantages of the present invention.

Having thus described the invention, what is claimed is—

1. A bicycle-support comprising opposite uprights connected together at their lower ends, continuous open-top seats loosely mounted upon the upper ends of the uprights and adapted to turn axially thereon, and holders carried by the seats, the latter being adapted to receive the rear forks of the bicycle and the holders to clamp over the upper faces of the forks, substantially as shown and described.

2. A bicycle-support, comprising opposite uprights connected together at their lower ends, and provided with spindles at their upper ends, seats for the rear forks of a bicycle, each of said seats having a sleeve extending below and a stud extending above the same, the sleeve being fitted upon its respective spindle and capable of turning thereon, and a holder fitted upon the stud and adapted to clamp over the upper faces of the forks, substantially as shown and described.

3. In a bicycle-support, the combination with opposite uprights connected together at their lower ends, and provided with spindles at their upper ends, of seats for the rear forks of a bicycle, each of said seats being carried at one side of a sleeve, and having a threaded stud extending from the sleeve above the seat, a holder fitted upon the stud and comprising a sleeve having a transverse lug or finger, and a thumb-nut provided upon the stud to clamp the holder against the upper faces of the rear forks, substantially as shown and described.

4. In a bicycle-support comprising opposite uprights, continuous offset and open-top seats loosely mounted upon the upper ends of the uprights transversely thereof and adapted to turn axially thereon, and holders pivoted to one side of the seats having a vertical adjustment and adapted to be turned laterally and overhang the seats, whereby the rear forks of the bicycle may be clamped upon said seats, substantially as shown and described.

In testimony that I claim the foregoing as my own I have hereto affixed my signature in the presence of two witnesses.

EUGENE FOWLER.

Witnesses:
SAMUEL L. KENNEY,
ISAAC J. WOOTTEN.